United States Patent

Nagai et al.

[11] Patent Number: 6,091,555
[45] Date of Patent: Jul. 18, 2000

[54] DIGITAL AUDIO SIGNAL PROCESSING METHOD AND APPARATUS WITH OFFSET ADDITION AND EXTRACTION

[75] Inventors: Ryuzo Nagai; Masaaki Isozaki, both of Kanagawa, Japan

[73] Assignee: Sony Corporation, Tokyo, Japan

[21] Appl. No.: 09/118,690

[22] Filed: Jul. 16, 1998

Related U.S. Application Data

[62] Division of application No. 08/620,881, Mar. 22, 1996, Pat. No. 5,889,917.

[30] Foreign Application Priority Data

Mar. 25, 1995 [JP] Japan .................................. 7-091399

[51] Int. Cl.[7] .................................................. G11B 27/02
[52] U.S. Cl. .............................................. 360/13; 386/54
[58] Field of Search ............................ 386/96, 104, 105, 386/54, 103; 360/13, 53; 348/512; 704/267

[56] References Cited

U.S. PATENT DOCUMENTS

| | | | |
|---|---|---|---|
| 4,559,568 | 12/1985 | Watanabe et al. | 360/53 X |
| 4,618,890 | 10/1986 | Kouyama et al. | 348/512 |
| 4,644,400 | 2/1987 | Kouyama et al. | 348/512 |
| 5,225,945 | 7/1993 | Mine et al. | 360/13 |

*Primary Examiner*—W. Chris Kim
*Attorney, Agent, or Firm*—Frommer Lawrence & Haug, LLP.; William S. Frommer

[57] ABSTRACT

A digital audio signal processing apparatus for creating coded edited data by insertion of second coded audio data coded in block units not synchronized with frames and fields into first coded audio data coded in block units also not synchronized with the frames and the fields at a request made by a command signal synchronized with the frames or the fields comprises coding means for creating the first and second coded audio data, and switching means for receiving the first and second coded audio data whereby selective switching of the first coded audio data and the second coded audio data from one to another is carried out at a location selected among a position specified by the command signal and positions before or after the specified position when the selected location coincides with a boundary between two consecutive coded blocks of the first and second coded audio data.

3 Claims, 10 Drawing Sheets

| FRAME NUMBER | OFFSET |
|---|---|
| 0 | 0 |
| 1 | -66 |
| 2 | -131 |
| 3 | -197 |
| 4 | -262 |
| 5 | -328 |
| 6 | -10 |
| 7 | -75 |
| 8 | -141 |
| 9 | -206 |
| 10 | -272 |
| 11 | -338 |
| 12 | -19 |
| 13 | -85 |
| 14 | -150 |
| 15 | -216 |
| 16 | -282 |
| 17 | -347 |
| 18 | -29 |
| 19 | -94 |
| 20 | -160 |
| 21 | -226 |
| 22 | -291 |
| 23 | 27 |
| 24 | -38 |
| 25 | -104 |
| ⋮ | ⋮ |
| 237 | -187 |
| 238 | -253 |
| 239 | -318 |
| 240 | 0 |

FIG. 4A
INPUT DATA
(INPUT AUDIO DATA D20)

FIG. 4B
PRE-READ HEAD'S OUTPUT
(PLAYBACK DATA D25)

FIG. 4C
ERROR-CORRECTING CIRCUIT'S OUTPUT
(REPRODUCED CODED DATA D26)

FIG. 4D
DECODING CIRCUIT'S OUTPUT
(DECODED DATA D27)

FIG. 4E
CROSS-FADE OUTPUT
(EDITED DATA D22)

FIG. 4F
CODING CIRCUIT'S OUTPUT
(CODED EDITED DATA D23)

FIG. 4G
RECORDING DATA (D24)

FIG. 4H
DATA AFTER RECORDING

FIG. 4I

FIG. 4J
OUTPUT OF DELAY CIRCUIT 39

FIG. 4K
DATA AFTER RECORDING

FIG. 11A
INPUT DATA

FIG. 11B
PRE-READ HEAD'S OUTPUT
(PLAYBACK DATA DI4)

FIG. 11C
ERROR-CORRECTING CIRCUIT'S
OUTPUT (REPRODUCED
CODED DATA DI5)

FIG. 11D
DECODING CIRCUIT'S OUTPUT
(DECODED DATA DI6)

FIG. 11E
CROSS-FADE OUTPUT
(EDITED DATA DII)

FIG. 11F
CODING CIRCUIT'S OUTPUT
(CODED EDITED DATA DI2)

FIG. 11G
RECORDING DATA (DI3)

FIG. 11H
DATA AFTER RECORDING

FIG. 11I

DIGITAL AUDIO SIGNAL PROCESSING METHOD AND APPARATUS WITH OFFSET ADDITION AND EXTRACTION

This is a division of application Ser. No. 08/620,881, filed Mar. 22, 1996, U.S. Pat. No. 5,889,917.

BACKGROUND OF THE INVENTION

The present invention relates to a digital audio signal processing method, a digital audio signal processing apparatus and a recording/playback apparatus. The present invention is well applicable to, for example, a digital video tape recorder for coding an audio signal into block units prior to the recording thereof.

The conventional techniques for reducing the amount of data of an audio signal by coding the audio signal into block units include the sub-band coding and the conversion coding. By these techniques, redundant components are effectively reduced or eliminated by using the maldistribution property of the audio signal in the frequency-axis direction. These techniques are adopted, for example, in the audio standards of the MPEG (Moving Picture Expert Group).

Figure 5:
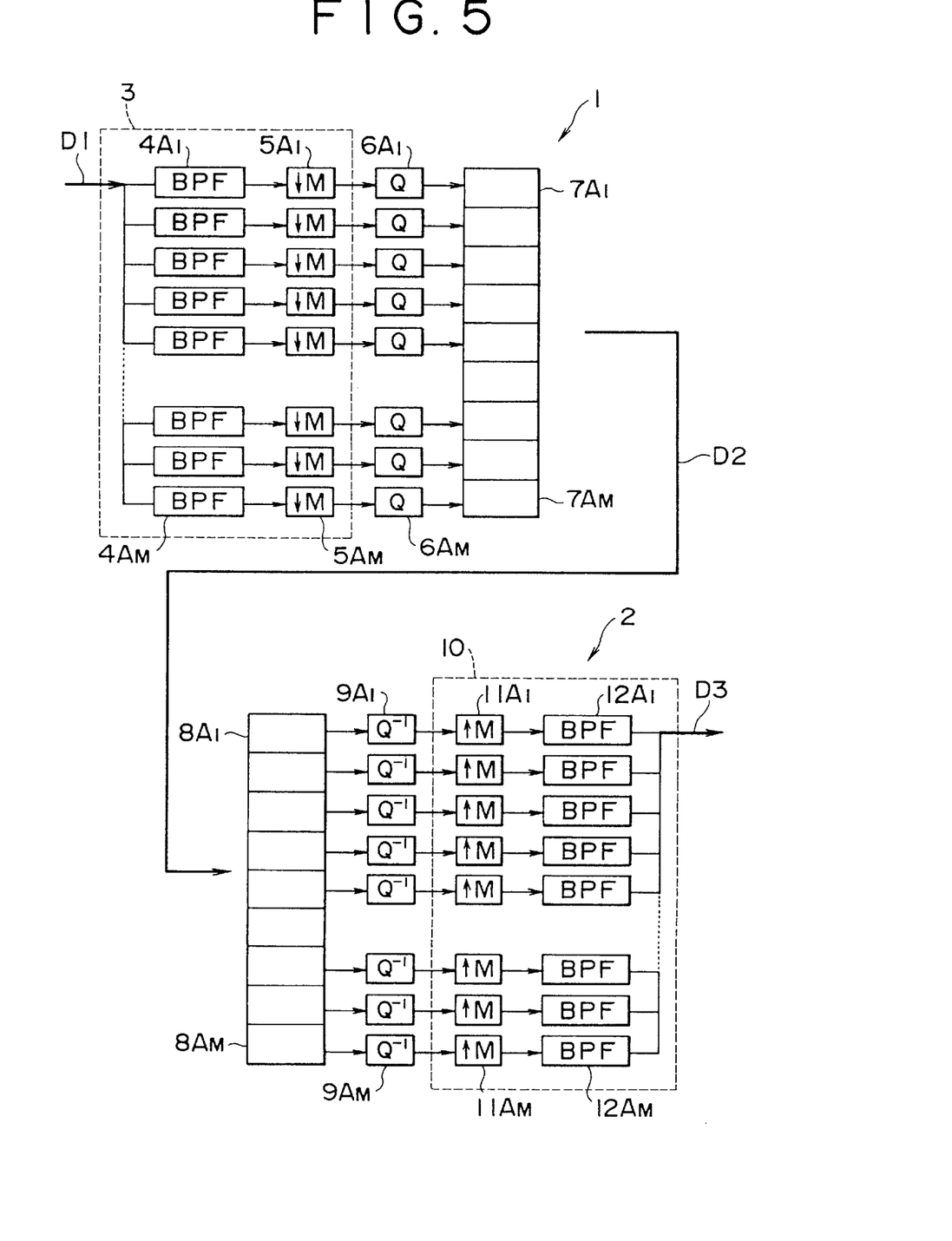
FIG. 5 is a block diagram showing a circuit configuration for implementing sub-band coding and sub-band decoding processes.

A general configuration of an encoder 1 and a decoder 2 for implementing an M-division sub-band encoding technique is shown in FIG. 5. As is shown in the figure, in the encoder 1, input audio data D1 is supplied to an analysis filter 3 having M band-pass filters (BPFs) $4A_1$ to $4A_M$ and down-sampling circuits $5A_1$ to $5A_M$. The input audio data D1 is divided into M frequency bands by the band-pass filters (BPFs) $4A_1$ to $4Am$. Frequency-band signals output by the band-pass filters $4A_1$ to $4A_M$ are then down-sampled to 1/M by the down-sampling circuits $5A_1$ to $5Am$. The frequency-band signals completing the down-sampling process are quantized by quantizers (Qs) $6A_1$ to $6A_M$ which are each provided for one of the frequency bands. Subsequently, signals output by the quantizers (Qs) $6A_1$ to $6A_M$ undergo packet conversion processing at packeting circuits $7A_1$ to $7Am$, being converted into sub-band coded data D2.

In the decoder 2, the sub-band coded data D2 is sequentially supplied to unpacketing circuits $8A_1$ to $8A_M$ and then to inverse-quantization circuits $9A_1$ to $9A_M$ in order to form the down-sampled frequency-band signals which are then fed to a synchronization filter 10. The synchronization filter 10 having up-sampling circuits $11A_1$ to $11A_M$ and band-pass filters (BPFs) $12A_1$ to $12A_M$ restores the frequency-band signals to the signal before the down sampling by means of the up-sampling circuits $11A_1$ to $11Am$. Frequency-band signals output by the up-sampling circuits $11A_1$ to $11A_M$ are then synthesized into a single band by means of the band-pass filters (BPFs) $12A_1$ to $12A_M$ to create restored audio data D3.

Figure 6:
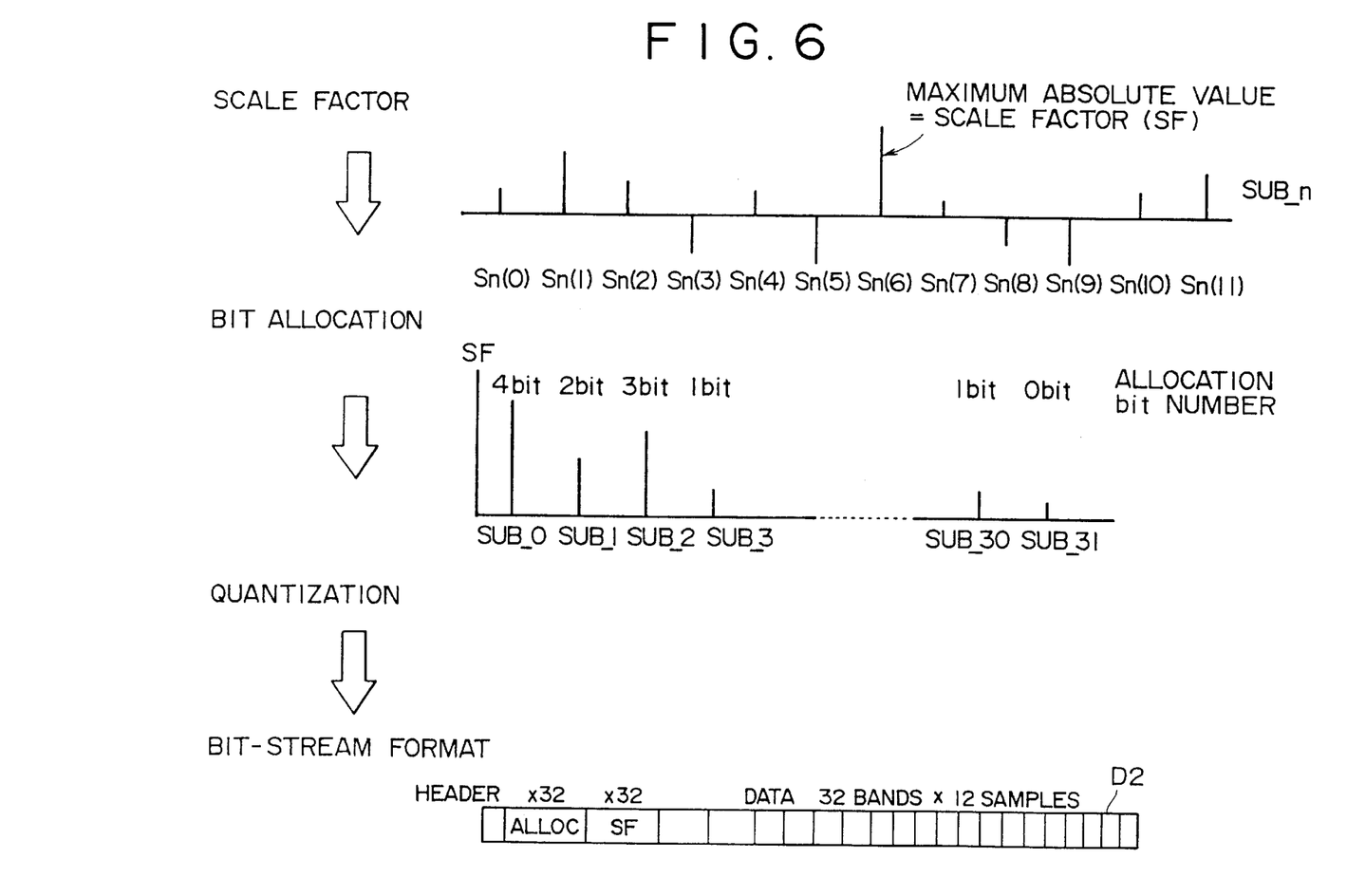
FIG. 6 is a sketch diagram used for explaining the sub-band encoding process.

The encoder 1 detects a maximum absolute value, which is referred to hereafter as a scale factor (SF), for each of the frequency-band signals when the frequency-band signals are quantized by the quantizers (Qs) $6A_1$ to $6A_M$ after completing the down-sampling process as shown in FIG. 6. Data of each sub-band is normalized by using the maximum absolute value for the sub-band before being quantized. At that time, a quantization level is allocated to each of the quantizers (Qs) $6A_1$ to $6A_M$ in accordance with the amount of data in the sub-band associated with the quantizer so as to produce a fixed amount of data as a whole. The allocation of quantization levels is referred to hereafter as bit allocation.

In the actual bit allocation, a quantizing-bit count is determined for each of the sub-bands from the magnitude of the scale factor for the sub band. In addition to the implementation of the bit allocation based on the magnitude of the scale factor, the bit allocation can also determined by using a psychological hearing model which utilizes properties of the sense of hearing possessed by a human being. A compression factor used in the coding process is determined by the total number of bits allocated in the quantization.

In the encoder 1, the packeting circuits $7A_1$ to $7A_M$ add a header denoted by HEADER, bit-allocation information (that is, information on the quantization level) denoted by ALLOC and scale-factor information denoted by SF one after another to sub-band data starting at the head of the sub-band data to create sub-band coded data D2. In the decoder 2, on the other hand, the sub-band coded data D2 is rearranged from data in a bit-stream state into trains of data for the sub-bands, before being restored into the original audio data by using the bit-allocation information and the scale-factor information.

Figure 7:
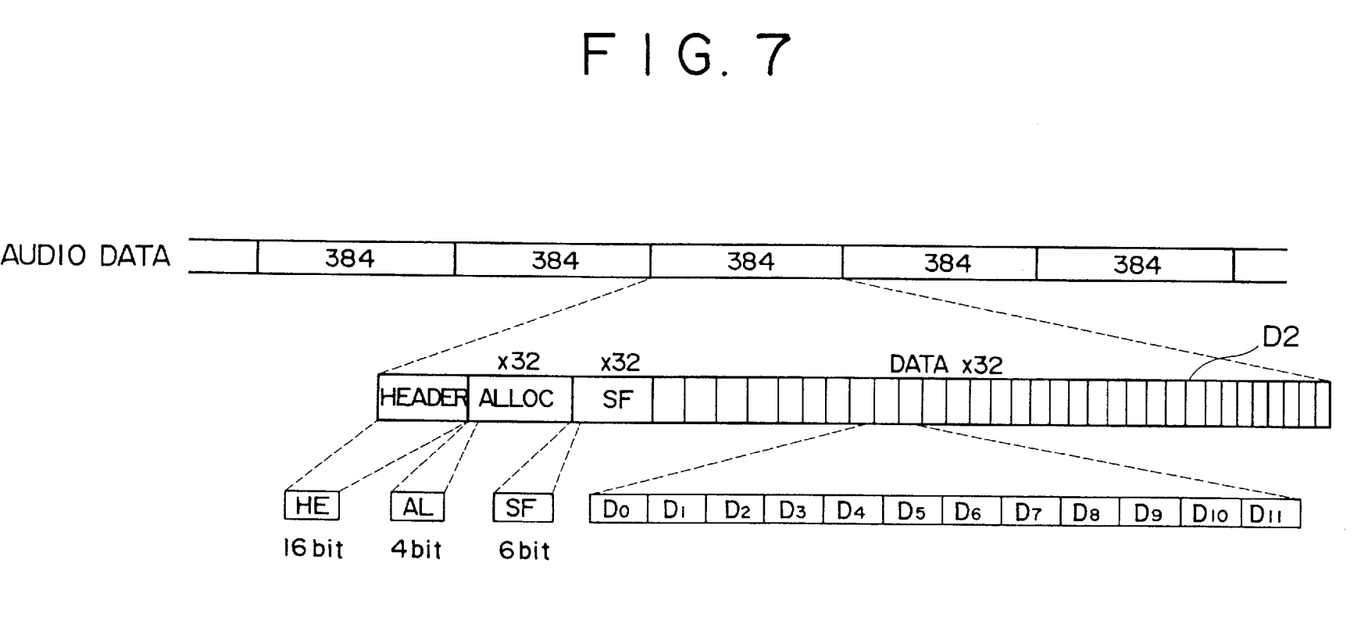
FIG. 7 is a sketch diagram used for explaining a bit stream of sub-band coded data.

A typical configuration of the bit stream of the sub-band coded data D2 is depicted in more detail in FIG. 7. The bit-allocation information (ALLOC) and the scale-factor information (SF) are arranged one after another into an array in each sub-band block, starting from a band in the low-frequency region in an order increasing frequencies to cover 32 bands. In the data area (DATA), a data block constituting a sub-band from 12 samples is created also to cover 32 bands starting with a low-frequency band in an order of increasing frequencies. In addition, a header (HEADER) describing the state of encoding is added to the beginning of each block. The header also includes information on a compression factor used in the coding process.

As such, a coded block is created from 384 audio samples. Thus, even though the number of bytes for the header (HEADER), the bit-allocation information (ALLOC) and the scale-factor information (SF) is fixed, the number of bytes in the data area (DATA) varies, depending upon the compression factor.

In this manner, sub-band coded data D2 is created with a predetermined number of samples treated as a unit coded block. In the case described above, 384 samples of input audio data are used as a unit coded block.

By the way, it is desirable to transmit or record coded audio data, which has been coded into block units as is described above, in synchronization with frames or fields of a video signal. In actuality, however, according to the MPEG audio standards, audio coded blocks are not in a synchronized relation with either frames or fields of a video signal. For this reason, if an attempt is made to edit coded audio data in frame or field units which are each a smallest unit of a picture, the continuity of the bit stream of audio coded blocks at boundary positions between any two consecutive frames or fields can not be retained, making it impossible to decode the data.

According to the MPEG audio standards, for example, the number of samples of an audio signal associated with a frame of an NTSC picture is prescribed to be 1,601 or 1,602. With the sub-band coding process wherein 384 samples are treated as a unit coded block as described above, on the other hand, the number of coded blocks in a frame is not an integer. That is to say, the frame and the coded blocks are not in a synchronized relation. For this reason, there is a coded block that crosses a boundary between two consecutive frames. As a result, discontinuity is resulted in within such a coded block when coded blocks are edited in frame units.

This problem is explained by taking a digital VTR as an example. An audio-data recording/playback unit 20 of the digital VTR shown in FIG. 8 has a configuration that allows input audio data D10 to be inserted for recording into a desired position in audio data already recorded in advance. In the audio-data recording/playback unit 20, the input audio data D10 is supplied to a cross-fade processing circuit 21 to undergo cross-fade processing therein. As a result of the cross-fade processing, edited data D11 is created and then supplied to an encoder 22.

Figure 8:
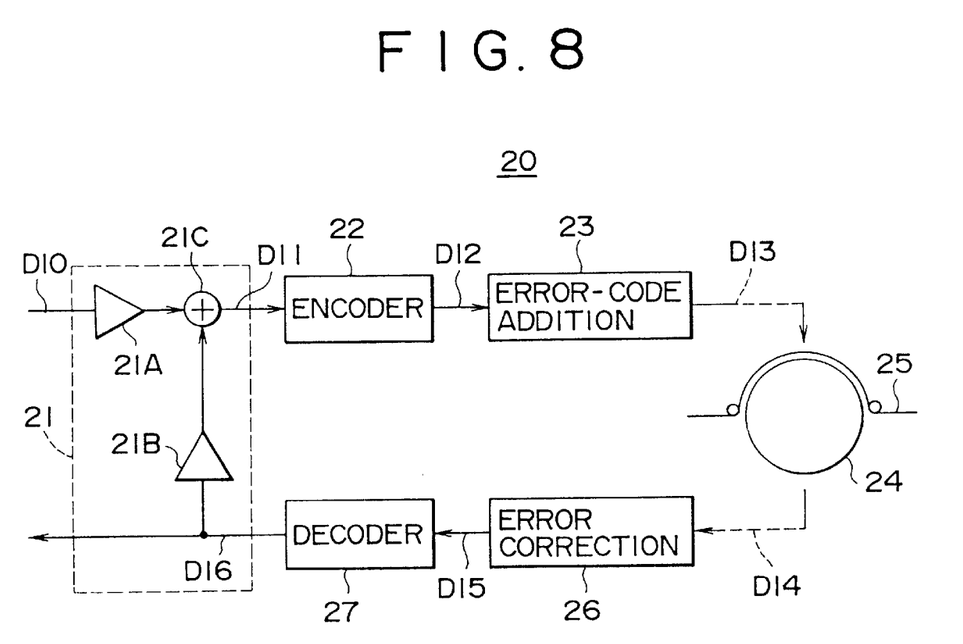
FIG. 8 is a block diagram showing the configuration of the conventional audio-data recording/playback apparatus.

As is shown in the figure, the cross-fade processing circuit 21 comprises an amplifier 21A for amplifying the input audio data D10, an amplifier 21B for amplifying decoded data D16 and an adder 21C for adding a signal output by the amplifier 21A to a signal output by the amplifier 21B. The cross-fade processing is carried out by gradually reducing the amplification degree of the amplifier 21B while gradually increasing the amplification degree of the amplifier 21A when recording the input audio data D10 into a desired position of the audio data recorded in advance. That is to say, the cross-fade processing is performed in order to remove the sense of incompatibility caused by an abrupt variation in audio signal which occurs on the boundary between the original data (the decoded data D16) and the insert data (the input audio data D10).

The encoder 22 creates coded edited data D12 by carrying out the sub-band coding processing described above on the edited data D11. The coded edited data D12 is then supplied to an error-code adding circuit 23. The error-code adding circuit 23 creates recording data D13 by adding a predetermined error code to the coded edited D12. The recording data D13 is supplied to a recording head mounted on a rotating drum 24 to be recorded into a magnetic tape 25 along with recording video data produced by a video-data coding circuit. It should be noted that the recording head and the video-data coding circuit are not shown in the figure.

At that time, in the audio-data recording/playback unit 20, a pre-read head preceding the recording head reads out audio data recorded in the magnetic tape 25 in advance, reproducing playback data D14. It should be noted that the pre-read head is also not shown in the figure. The playback data D14 is supplied to an error correcting circuit 26. The error correcting circuit 26 restores playback coded data D15 by using error codes added to playback data D14. The playback coded data D15 is then supplied to a decoder 27. The decoder 27 outputs the decoded data D16 by carrying out processing opposite to that performed by the encoder 22. The decoded data D16 is then supplied to the cross-fade processing circuit 21 as well as to external equipment such as a speaker.

The edit processing described above is carried out in frame or field units which are synchronous with the video signal. Since coded blocks resulting from the sub-band processing are not synchronous with frames or fields, however, audio coded blocks which can not be decoded are generated.

Figure 9:
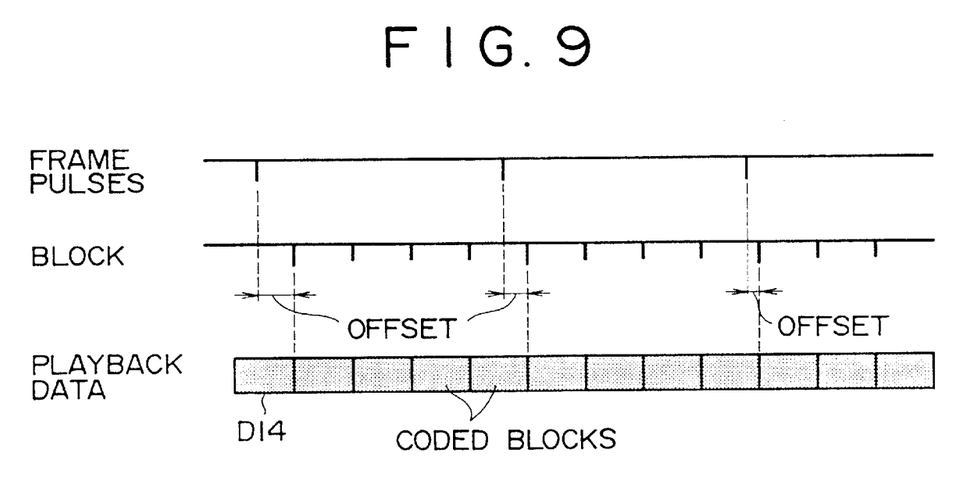
FIG. 9 is timing charts showing a relation between frame pulses and coded data resulting from a coding process of data into blocks not synchronized with frames.

This problem is explained in concrete terms by referring to FIG. 9 as follows. When coded blocks associated with a frame are played back, a coded block crossing the boundary between two consecutive frames can not be decoded. This is because, when an attempt is made to edit various pieces of information added to the head of each coded block for decoding purposes in frame units, the pieces of information can not be extracted from a coded block that crosses the boundary between two consecutive frames. The pieces of information are the header information, the bit-allocation information and the scale-factor information described earlier.

Even if playback audio data prior to the edit processing can be completely decoded, in some cases, coded audio data recorded after the edit processing can not be decoded any more. In order to explain this problem, edit processing based on the assumption that playback audio data prior to the edit processing is decodable is explained as follows.

Figure 10:
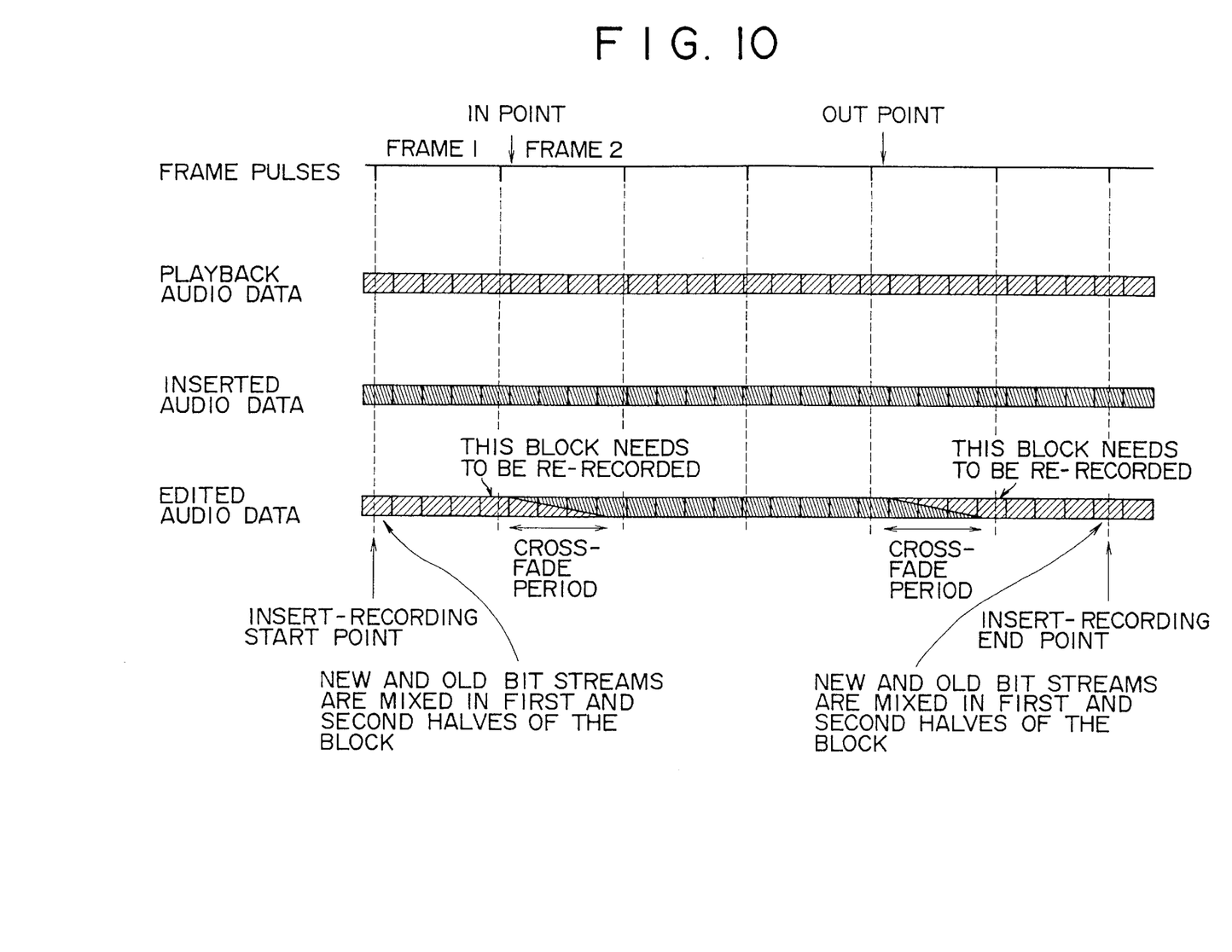
FIG. 10 is timing charts used for explaining that it is impossible to decode data resulting from edit processing of coded blocks not synchronized with frames in frame units.

A typical editing process in which cross-fade processing is carried out is shown in FIG. 10. In the first place, IN and OUT points of the edit processing are set at arbitrary positions. In the case of the editing process shown in the figure, the IN and OUT points are each set at a position in close proximity to a boundary between two consecutive frames. First of all, let us pay attention to the IN point. In the case of the editing process shown in the figure, the head of a cross fade is located in frame 2 but an audio coded block including the head of the cross fade, which is to be recorded, crosses the boundary between frames 1 and 2. A smallest rewritable unit in the edit processing is a frame. As a result, when the rewriting is started at frame 2, the audio coded block crossing the boundary between frames 1 and 2 is divided into first and second halves which are included in trains of data (or bit streams) and entirely different from each other, making it impossible to carry out the next decoding.

The above explanation holds true of the OUT point. To be more specific, an audio decoded block that can not be decoded is inevitably resulted in on the boundary between two consecutive frames. Since the smallest recording unit of the edit processing is a frame, discontinuity of an audio coded block is inevitably resulted in on the boundary between two consecutive frames regardless of which frame the actual rewriting is to be started from, giving rise to a shortcoming that coded data recorded after the edit processing can not be decoded any more.

The actual edit processing is explained in concrete terms by referring to FIGS. 11A to 11I. In FIGS. 11A to 11I, capital characters are used for denoting data which has not undergone a compression coding process (that is, linear PCM data) whereas small-case characters denote data completing a compression coding process (that is, sub-band coded data). A symbol having the apostrophe "'" as a suffix thereof such as s' or t' etc. is used for indicating data which has completed a second compression coding process. Data which has undergone a second compression coding process after completing a first one as such is referred to hereafter as second-generation coded data. In addition, a boundary between two consecutive pieces of data shown in FIGS. 11A to 11H is a boundary between two consecutive frames of a video signal. It should be noted that the encoding and decoding processes always delay the coded and decoded data respectively by a time equal to the length of one frame.

Figure 11A:
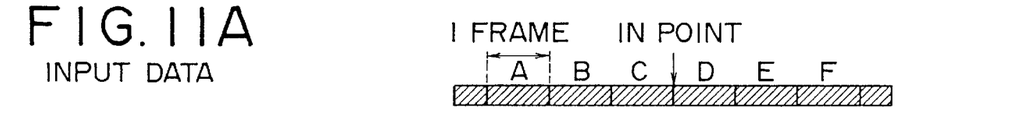
FIGS. 11A to 11I are timing charts used for explaining that it is impossible to decode data resulting from edit processing of coded blocks not synchronized with frames in frame units.
Figure 11B:
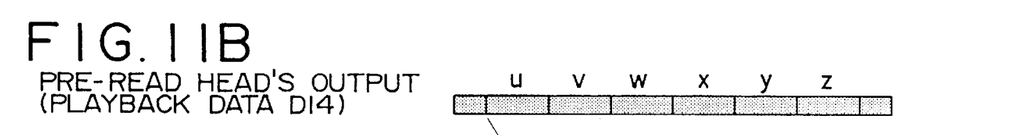
Figure 11C:
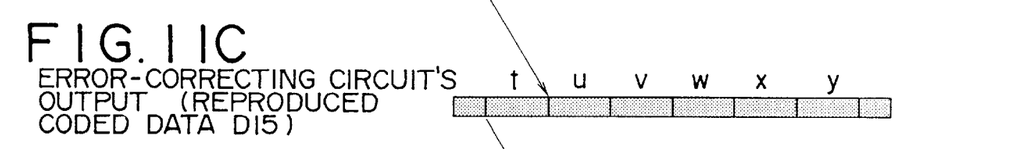
Figure 11D:
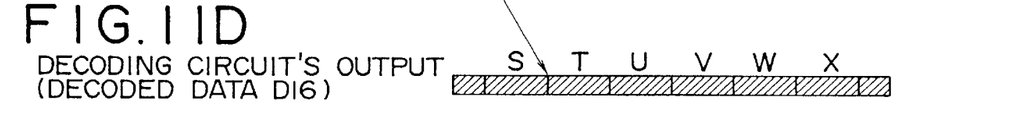
Figure 11E:
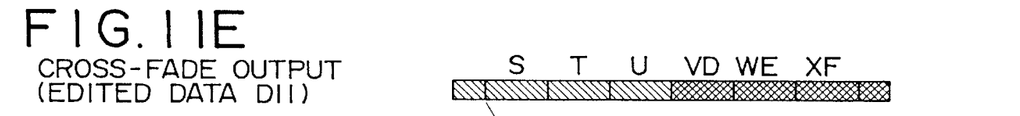
Figure 11F:
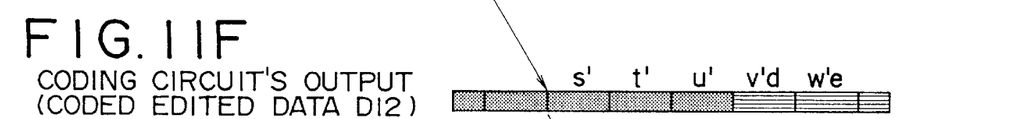

Pieces of data t, u, - - - (that is, the reproduced coded data D15 shown in FIG. 11C) output by the error-correcting circuit 26 are decoded by the decoder 27 into pieces of data T, U, - - - (that is, the data D16 shown in FIG. 11D). The pieces of data T, U, - - - output by the decoder 27 are then converted by the cross-fade processing circuit 21 into pieces of edited data T, U, - - - (that is, the data D11 shown in FIG. 11E). Subsequently, the pieces of edited data T, U, - - - are coded by the encoder 22 into pieces of coded edited data t', u', - - - (that is, the playback coded data D12 shown in FIG. 11F). The pieces of coded edited data t', u', - - - are finally processed by the error-code adding circuit 23 into pieces of recording data t', u', - - - (that is, the data D13 shown in FIG. 11G).

Figures 11G, 11H, 11I:
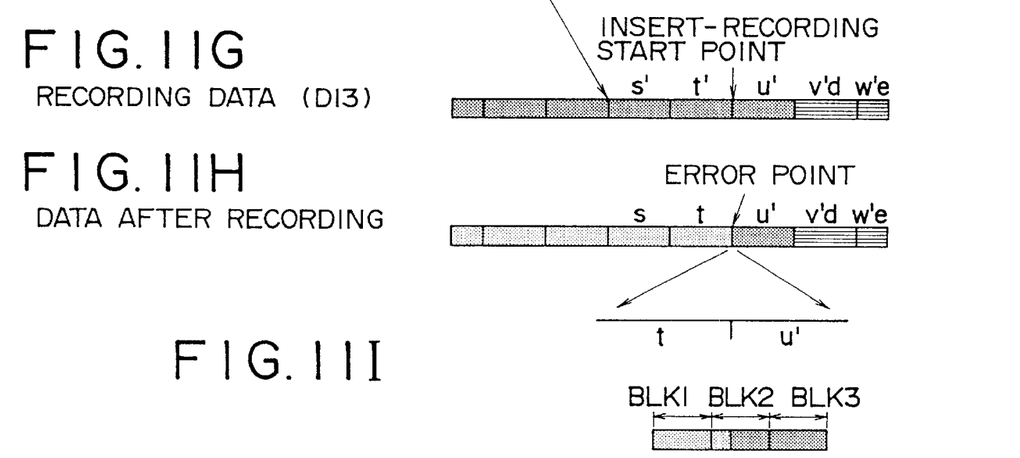

Let an attempt be made to insert the piece of recording data u' and the subsequent pieces of recording data into a point after the original recording data t as is shown in FIG. 11H. In this attempt, the second-generation recording data u' is concatenated to the original recording data t as inserted data at a boundary location between two consecutive frames, resulting in discontinuity in a coded block BLK2 crossing this boundary as is shown in FIG. 11I. That is to say, the coded block BLK2 includes the firs-generation coded data t and the second-generation recording data u' and, thus can not be decoded.

The present invention addresses the problem described above. To be more specific, the present invention provides a digital audio signal processing method, a digital audio signal processing apparatus and a recording/playback apparatus whereby a discontinuity point of a coded block is prevented from being resulted in due to edit processing, allowing all pieces of coded data to be decoded in order to reproduce audio data even if the edit processing is carried out on coded blocks not synchronous with frames or fields, the smallest edit-processing unit.

SUMMARY OF THE INVENTION

It is therefore an object of the present invention to provide a digital audio signal processing method, a digital audio signal processing apparatus and a recording/playback apparatus which create edited coded audio data by starting or ending insertion of second coded audio data into first coded audio data at a location selected among a position specified by a command signal synchronized with a frame or a field and positions before or after the specified position when the selected location coincides with a boundary between two consecutive coded blocks of the first and second coded audio data.

It is another object of the present invention to start or end insertion of second coded audio data into first coded audio data at a position detected as a position coinciding with a boundary between two consecutive coded blocks of the first and second coded audio data by virtue of an offset added to the first and second coded audio data which offset is equal to a distance from an edge of a coded block to a boundary between two consecutive frames or fields.

It is a further object of the present invention to insert second coded audio data into first coded audio data prior to recording after adjusting the phase of coded blocks of the second coded audio data to the phase of coded blocks of the first coded audio data in accordance with the magnitude of an offset which phase adjustment is carried out through the steps of:

adding an offset, a distance from the edge of a coded block of the first coded audio data to a boundary between two consecutive frames or fields, to the first coded audio data by using offset adding means when recording the first coded audio data into a recording medium;

extracting the offset added to the first coded audio data by using offset extracting means when playing back the first coded audio data from a recording medium;

supplying the extracted offset to coding means; and creating the second coded audio data by using the coding means in accordance with the offset supplied thereto.

According to first aspect of the present invention, a digital audio signal processing apparatus for creating coded edited data by insertion of second coded audio data coded in block units not synchronized with frames and fields into first coded audio data coded in block units also not synchronized with the frames and the fields at a request made by a command signal synchronized with the frames or the fields comprises:

a coding means for creating the first and second coded audio data; and a switching means for receiving the first and second coded audio data whereby selective switching of the first coded audio data and the second coded audio data from one to another is carried out at a location selected among a position specified by the command signal and positions before or after the specified position when the selected location coincides with a boundary between two consecutive coded blocks of the first and second coded audio data.

According to second aspect of the present invention, a digital audio signal processing apparatus for creating coded edited data by insertion of second coded audio data coded in block units not synchronized with frames and fields into first coded audio data coded in block units also not synchronized with the frames and the fields at a request made by a command signal synchronized with the frames or the fields comprises:

a coding means for creating the first and second coded audio data;

a switching means for receiving the first and second coded audio data whereby selective switching of outputs of the first coded audio data and the second coded audio data from one to another is carried out at a location selected among a position specified by the command signal and positions before or after the specified position when the selected location coincides with a boundary between two consecutive coded blocks of the first and second coded audio data; and a delay means for delaying the first coded audio data by a predetermined time in order to make the phase of the coded blocks of the first coded audio data coincide with the phase of the coded blocks of the second coded audio data.

According to third aspect of the present invention, a digital audio signal processing apparatus for creating coded edited data by insertion of second coded audio data coded in block units not synchronized with frames and fields into first coded audio data recorded in a recording medium in advance in block units also not synchronized with the frames and the fields at a request made by a command signal synchronized with the frames or the fields comprises:

an offset adding means for adding the first coded audio data with offsets from edges of coded blocks thereof to boundaries between any consecutive two of the frames of fields at recording of the first coded audio data into the recording medium;

a playback means for reproducing coded data recorded in the recording medium;

an offset extracting means for extracting the offsets from the first coded audio data;

a coding means for using the offsets received from the offset extracting means to make the phase of the coded blocks of the first coded audio data coincide with the phase of the coded blocks of the second coded audio data in a coding process; and a recording means for recording the second coded audio data resulting from the coding process carried out by the coding means into the recording means.

According to fourth aspect of the present invention, a digital audio signal processing method for creating coded edited data by insertion of second coded audio data coded in block units not synchronized with frames and fields into first coded audio data coded in block units also not synchronized with the frames and the fields at a request made by a command signal synchronized with the frames or the fields comprises:

a first coding step for creating the first coded audio data from first input audio data;

a second coding step for creating the second coded audio data from second input audio data; and an edited data creating step for creating the coded edited data, at which step, insertion of the second coded audio data into the first coded audio data is started or ended at locations selected among a position specified by the command signal and positions before or after the specified position when the selected locations each coincide with a boundary between two consecutive coded blocks of the first and second coded audio data.

According to the present invention, insertion of second coded audio data into first coded audio data is started or ended at a location selected among a position specified by a command signal synchronized with a frame or a field and positions before and after the specified position when the selected location coincides with a boundary between two consecutive coded blocks of the first and second coded audio data, so that a discontinuity point of any coded block can be prevented from being resulted in due to the edit processing. As a result, edited coded audio data, all pieces of coded data of which are decodable, can be created.

Also according to the present invention, an offset equal to a distance from an edge of a coded block to a boundary between two consecutive frames or fields is added to the first and second coded audio data and a position coinciding with a boundary between two consecutive coded blocks of the first and second coded audio data is detected in accordance with the offset, allowing the boundary between two consecutive coded blocks to be identified with ease.

DETAILED DESCRIPTION OF THE PREFERRED EMBODIMENTS

The present invention will become apparent from the following detailed description of preferred embodiments with reference to accompanying diagrams.

Figure 1:
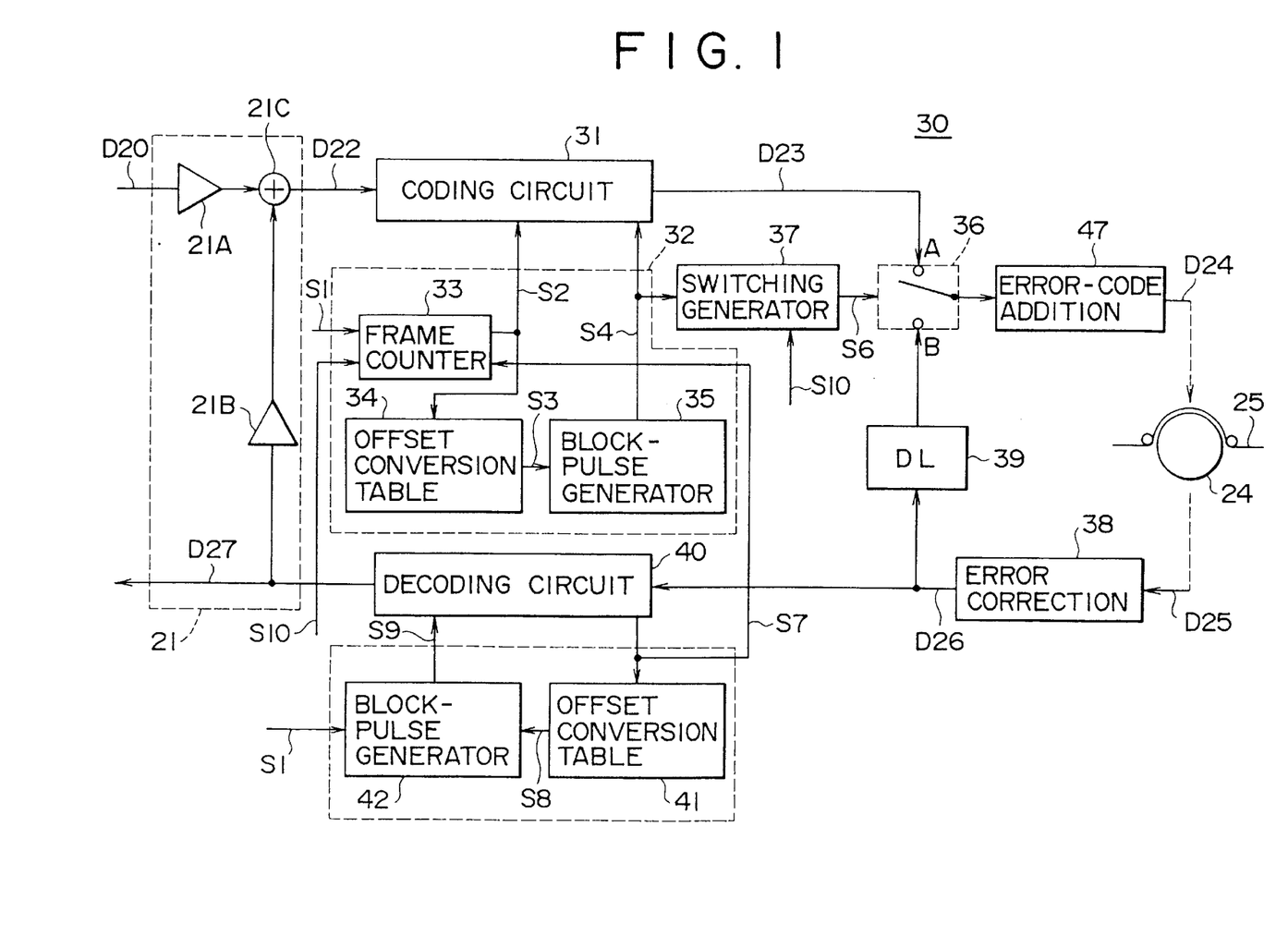
FIG. 1 is a block diagram showing the configuration of an audio-data recording/playback apparatus provided by the present invention.

Elements shown in FIG. 1 identical with those shown in FIG. 8 are denoted by the same reference numerals as those shown in FIG. 8. Reference numeral 30 denotes an audio-data recording/playback apparatus as a whole. The audio-data recording/playback apparatus 30 allows input audio data D20 to be inserted into and recorded along with coded audio data which has been recorded on a magnetic tape 25 in advance. In the audio-data recording/playback apparatus 30, the input audio data D20 is supplied to the cross-fade processing circuit 21 to undergo cross-fade processing therein. The cross-fade processing eliminates the sense of incompatibility caused by an abrupt change in audio signal at a boundary position between the original data (that is, the decoded data D27) and the data to be inserted (that is, the input audio data D20). The cross-fade processing circuit 21 outputs edited data D22 which is then supplied to a coding circuit 31. The coding circuit 31 carries out a sub-band coding process on the edited data D22 in order to produce coded edited data D23.

The audio-data recording/playback apparatus 30 has a timing generator 32 which employs a frame counter 33. A frame pulse signal S1 synchronized with frames of the video signal S10 is supplied to the frame counter 33 which is used for counting the number of pulses in the frame pulse signal S1. The frame counter 33 generates a frame-number signal S2 indicating the number of a frame for which the input audio data D20 is currently supplied to the coding circuit 31. The frame-number signal S2 is transmitted to the coding circuit 31 and an offset conversion table 34.

Figure 2:
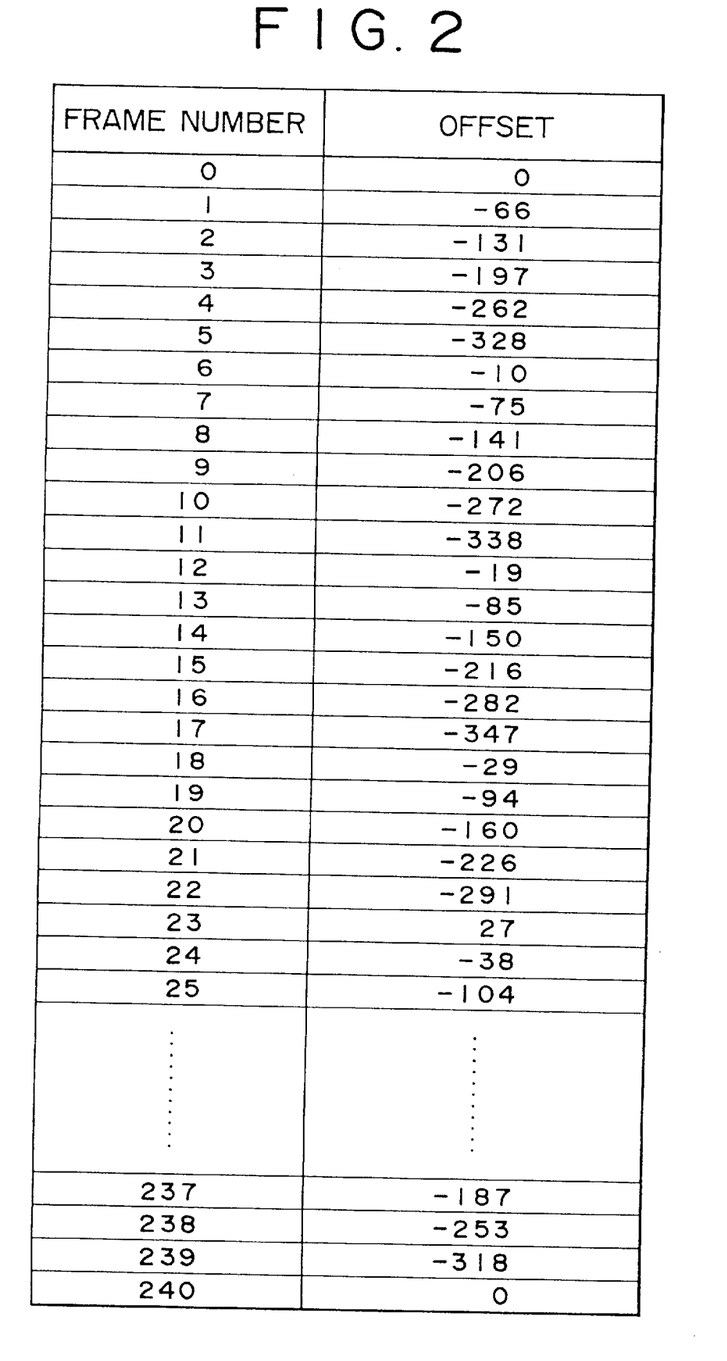
FIG. 2 shows the contents of an offset conversion table.

As is shown in FIG. 2, the offset conversion table 34 contains frame numbers and offsets associated with the frame numbers which offsets each indicate the distance from the boundary between two consecutive coded blocks in the frame associated with the offset to the boundary between the frame and the frame adjacent thereto. The offsets listed in the offset conversion table 34 shown in FIG. 2 are obtained for a case in which one audio coded block comprises 384 samples and the number of samples in an audio signal corresponding to one frame of an NTSC picture is 1,601 or 1,602. To explain the offset conversion table 34 shown in the figure in concrete terms, for frame 0, the offset is 0 because the edge of the coded block in frame 0 coincides with the edge of frame 0. As for frame 1, the coded-block boundary is separated away from the frame boundary by 66 samples. Accordingly, the offset for frame 1 is 66. In the NTSC system, the number of samples associated with a frame is 1,601 or 1,602. As a result, with a coded block sampled 384 times, 240 frames constitute a cycle in which all the 240 frames each have a unique offset.

Receiving the frame-number signal S2, the offset conversion table 34 transmits an offset signal S3, which represents an offset associated with a frame indicated by the frame-number signal S2, to a block-pulse generating circuit 35. In accordance with the offset signal S3, the block-pulse generating circuit 35 generates a block-pulse signal S4, which specifies the boundary of a coded block of the audio signal, outputting the block-pulse signal S4 to the coding circuit 31. That is to say, a pulse coinciding with the boundary between two consecutive coded blocks of the audio signal is output by the block-pulse generating circuit 35.

The coding circuit 31 carries out the sub-band coding process on the edited data D22 in such a way that data in a period between two consecutive pulses in the block-pulse signal S4 forms one coded block, creating coded edited data D23 through addition of the frame-number signal S2 generated by the frame counter 33 to the result of the sub-band coding process. The coded edited data D23 is supplied to an A terminal of a switcher 36.

In addition, the block-pulse signal S4 output by the block-pulse generating circuit 35 is also supplied to a switching generator 37 as well. In accordance with the block-pulse signal S4, the switching generator 37 generates a switching control signal S6, supplying the switching control signal S6 to the switcher 36. The switching operation of the switcher 36 is carried out in accordance with the switching control signal S6. To be more specific, the switching operation can always be performed on the boundary between two consecutive coded blocks of the audio signal. A signal output by the switcher 36 is supplied to an error-code adding circuit 47 for producing recording data D24 to be recorded on a magnetic tape 25 by means of a recording head.

Later on, the recording data D24 is read out as playback data D25 by a pre-read head preceding the recording head. The playback data D25 is supplied to an error-correcting circuit 38 for generating reproduced coded data D26 which is supplied to a terminal B of the switcher 36 through a delay circuit (DL) 39 as well as to a decoding circuit 40. The reproduced coded data D26 is delayed by the delay circuit 39 by a time equal to a time required for re-recording the playback data D25 reproduced by the pre-read head exactly into the original recording area of the playback data D25 on the magnetic tape 25 through the error-correcting circuit 38, the delay circuit 39, the switcher 36, the error-code adding circuit 47 and the recording head.

Receiving the reproduced coded data D26, the decoding circuit 40 extracts the frame-number signal S7 added by the coding circuit 31 from the reproduced coded data D26 and then transmits the frame-number signal S7 to an offset conversion table 41. Much like the offset conversion table 34, the offset conversion table 41 also contains frame numbers and offsets associated with frames indicated by the frame numbers. Receiving the frame-number signal S7, the offset conversion table 41 transmits an offset signal S8 representing an offset associated with a frame indicated by the frame-number signal S8 to a block-pulse generating circuit 42.

The block-pulse generating circuit 42 generates a block-pulse signal S9, which specifies the position of a boundary between two consecutive audio coded blocks, in accordance with the offset signal S8, outputting the block-pulse signal S9 to the decoding circuit 40. As a result, by referring to the block-pulse signal S9, the decoding circuit 40 can detect the position of a boundary between two consecutive coded blocks and, thus, carry out the decoding process in coded-block units. In this way, the block-pulse generating circuit 42, which is reset on the rising edge of the frame pulse S1, can output the block-pulse signal S9. The block-pulse signal S9 is updated for each frame by the offset signal S8 representing an offset.

In addition, in the audio-data recording/playback apparatus 30, the frame-number signal S7 extracted from the reproduced coded data D26 by the decoding circuit 40 is fed back to the frame counter 33 on the decoding side. The frame counter 33 loads the frame-number signal S7 supplied thereto and passes on the frame-number signal S7 as it is to the coding circuit 31 and the offset conversion table 34 as the frame-number signal S2. In this way, in accordance with an insert command signal S10 provided by an external control unit which is not shown in the figure, the frame counter 33 outputs the frame-number signal S2 based on the frame-pulse signal S1 when an insert-recording process is not requested or loads the frame-number signal S7 therein when an insert-recording process is requested.

As such, the coding circuit 31 carries out sub-band coding on the edited data D22 in such a way that the edited data D22 is converted into one coded block with the block-pulse signal S4 taken as a reference in accordance with the frame-number signal S7 fed-back from the decoding side. The coding circuit 31 also creates coded edited data D23 by adding the frame-number signal S7 to the result of decoding. As a result, the audio-data recording/playback apparatus 30 can make the phase of coded blocks of the coded edited data D23 coincide with the phase of coded blocks of the reproduced coded data D26.

Figure 3A:
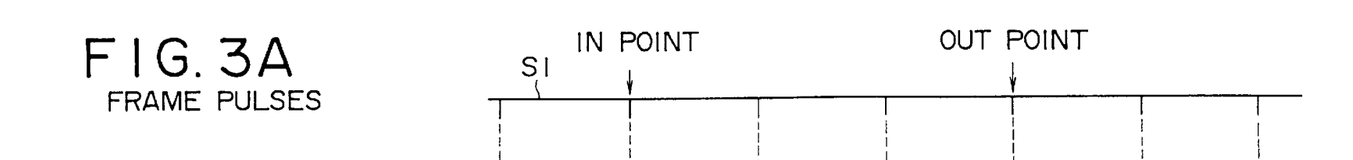
FIGS. 3A to 3D are timing charts used for explaining a switching point in an insert-recording process.
Figure 3B:
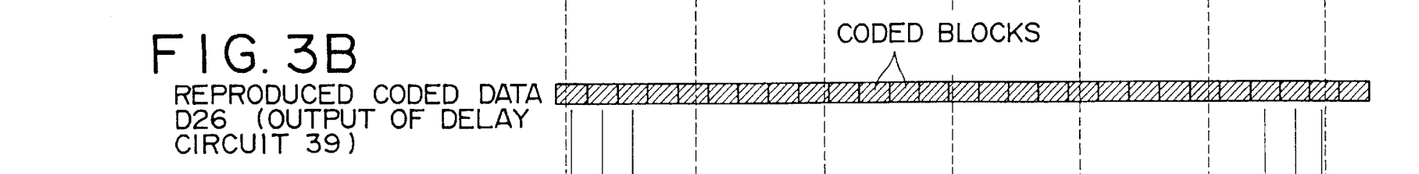
Figures 3C, 3D:
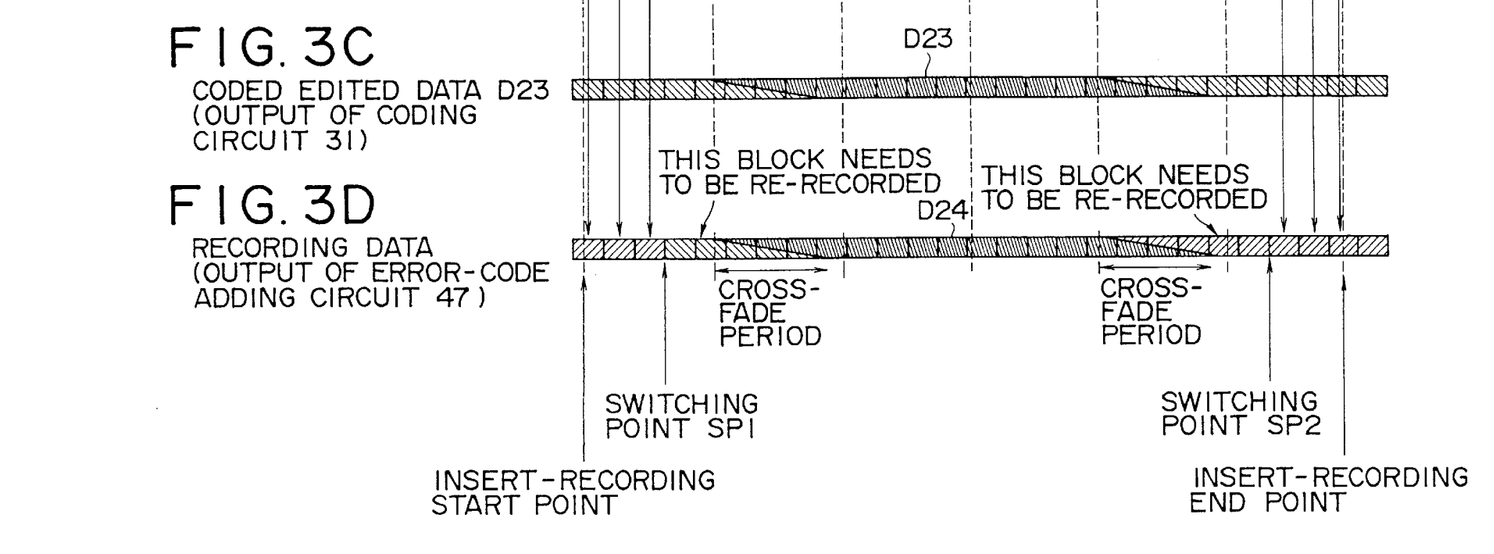

In actuality, as is shown in FIGS. 3A to 3D, the audio-data recording/playback apparatus 30 makes the phase of coded blocks of the reproduced coded data D26 shown in FIG. 3B match the phase of coded blocks of the coded edited data D23 shown in FIG. 3C by supplying the reproduced coded data D26 to the switcher 36 through the delay circuit 39 and supplying the coded edited data D23 output by the coding circuit 31 to the switcher 36.

Next, switching operations which are carried out by the switcher 36 when an insert-recording process is requested is explained. Receiving the insert command signal S10 which requests that the coded edited data D23 be recorded into the magnetic tape 25, the switching generator 37 outputs the switching control signal S6 on the rising edge of the block-pulse signal S4 generated by the block-pulse generating circuit 35. The switching control signal S6 causes the switcher 36 which has been connected to the B-terminal side to switch the connection thereof from the B-terminal side to the A-terminal side. In this way, a switchover from the reproduced coded data D26 to the coded edited data D23 can be made on the boundary between two consecutive coded blocks, making it possible to prevent coded data of different generations from being mixed in one coded block.

In actuality, the audio-data recording/playback apparatus 30 lets switching take place at a switching point SP1 in a frame immediately before the specified IN point as is shown in FIGS. 3A to 3D. Prior to the switching point SP1, the reproduced coded data D26 is re-recorded. After the switching point SP1, on the other hand, the coded edited data D23 obtained from the coding circuit 31 is recorded. The location of the switching point SP1 is specified on the boundary between two consecutive coded blocks prior to the IN point, that is, at a position where the boundary between two consecutive coded blocks of the coded edited data D23 output by the coding circuit 31 coincides with the boundary between two consecutive coded blocks of the reproduced coded data D26 output by the delay circuit 39, making it possible to prevent coded data of different generations from being mixed in one coded block.

In addition, the audio-data recording/playback apparatus 30 lets switching in the opposite direction take place at a switching point SP2 in a frame lagging behind the specified OUT point by one frame. To be more specific, the switching generator 37 outputs the switching control signal S6 synchronized with the phase of the coded block to the switcher 36, requesting the switcher 36 which has been connected to the A-terminal side so far to switch the connection thereof from the A-terminal side to the B-terminal side. Prior to the switching point SP2, the coded edited data D23 is recorded. After the switching point SP2, on the other hand, the reproduced coded data D26 is re-recorded. Much like the switching point SP1, the location of the switching point SP2 is specified on the boundary between two consecutive coded blocks after the OUT point, that is, at a position where the boundary between two consecutive coded blocks of the coded edited data D23 output by the coding circuit 31 coincides with the boundary between two consecutive coded blocks of the reproduced coded data D26 output by the delay circuit 39, making it possible to prevent coded data of different generations from being mixed in one coded block.

Next, the switching operations taking place in the audio-data recording/playback apparatus 30 are explained in more detail by referring to FIGS. 4A to 4K. In FIGS. 4A to 4K, capital characters are used for denoting data which has not undergone a compression coding process (that is, linear PCM data) whereas small-case characters denote data completing a compression coding process (that is, sub-band coded data). A symbol having the apostrophe "'" as a suffix thereof such as s' or t' etc. is used for indicating data which has completed a second compression coding process. In addition, a data boundary shown in FIGS. 4A to 4K represents the edge of a frame. It should be noted that the encoding and decoding processes always delay the coded and decoded data respectively by a time equal to the length of one frame.

Figure 4A:
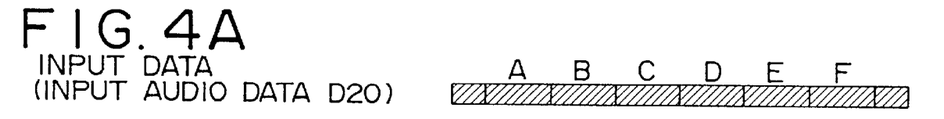
FIGS. 4A to 4K are timing charts used for explaining a switching point in an insert-recording process.
Figure 4B:
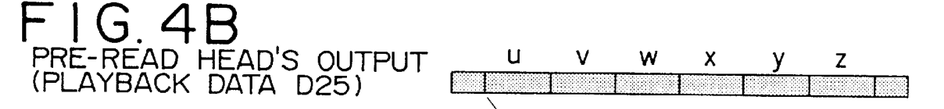
Figure 4C:
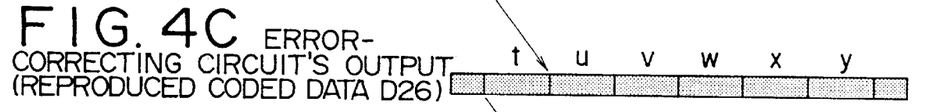
Figure 4D:
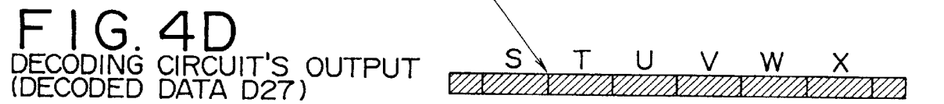
Figure 4E:
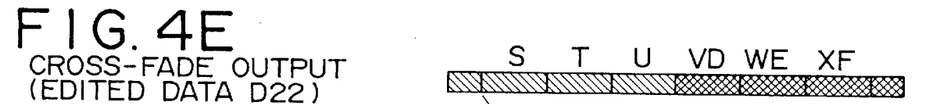
Figure 4F:
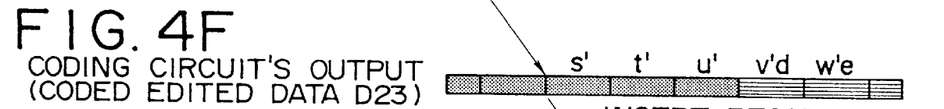
Figure 4G:
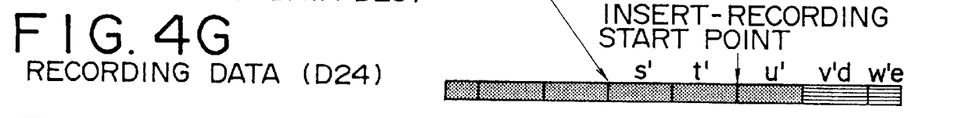

Pieces of data t, u, - - - (that is, the reproduced coded data D26 shown in FIG. 4C) output by the error-correcting circuit 38 are decoded by the decoding circuit 40 into pieces of data T, U, - - - (that is, the data D27 shown in FIG. 4D). The pieces of data T, U, - - - output by the decoding circuit 40 are then converted by the cross-fade processing circuit 21 into pieces of edited data T, U, - - - (that is, the data D22 shown in FIG. 4E). Subsequently, the pieces of edited data T, U, - - - are coded by the coding circuit 31 into pieces of coded edited data t', u', - - - (that is, the playback coded data D23 shown in FIG. 4F). The pieces of coded edited data t', u', - - - are finally processed by the error-code adding circuit 47 into pieces of recording data t', u', - - - (that is, the data D24 shown in FIG. 4G). Accordingly, symbols VD, v', d, etc. denote pieces of data currently undergoing the cross-fade processing.

Figure 4H:
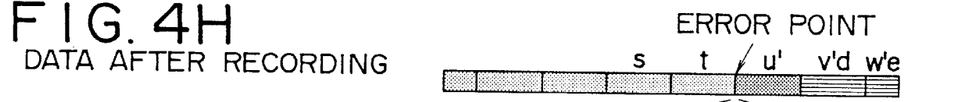
Figure 4I:
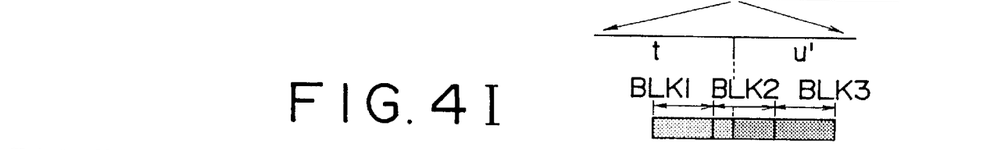
Figure 4J:
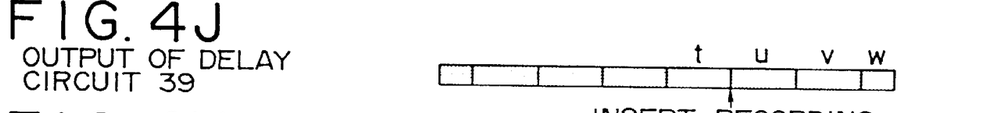

Let an attempt be made to insert the piece of recording data u' and the subsequent pieces of recording data into a point after the original recording data t as is shown in FIG. 4H. In this attempt, the second-generation recording data u' would be concatenated to the original recording data t as inserted data at a boundary location between two consecutive frames, resulting in discontinuity in a coded block BLK2 crossing this boundary as is shown in FIG. 4I. That is to say, the coded block BLK2 includes the firs-generation coded data t and the second-generation recording data u'.

Figure 4K:
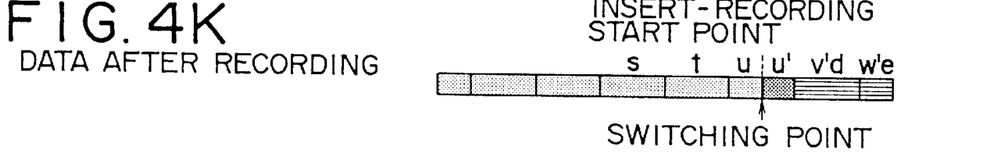

In the case of the embodiment, however, the second-generation recording data u' is not concatenated to the original recording data t as inserted data at a boundary location between two consecutive frames. Instead, the coded data u that has been once played back is re-recorded up to the boundary between two consecutive coded blocks as is shown in FIG. 4K. As the boundary is reached, the connection of the switcher 36 is changed from the B-terminal side to the A-terminal side, starting the operation to record the edited coded data u', v'd, w'e, - - - - . That is to say, the switching point shown in FIG. 4K just coincides with the boundary between two consecutive coded blocks.

As described above, in order to select a location coinciding with the boundary between two consecutive coded blocks as a switching point, it is necessary to make the phase of coded blocks of the first-generation coded data (or reproduced coded data) s, t, u - - - match the phase of coded blocks of the second-generation coded data (or edited coded data) u', v'd, w'e - - - - . For this reason, in the audio-data recording/playback apparatus 30, frame numbers are added to coded data in the coding process and the frame numbers are fed back to the coding side in a playback operation in order to adjust the phases of the coded blocks to each other.

In the configuration described above, the audio-data recording/playback apparatus 30 appends frame numbers to coded blocks in advance in a coding process. The frame numbers are each used to indicate which frame a coded block pertains to. In an insert-recording process, the audio-data recording/playback apparatus 30 extracts the frame numbers on the decoding side and transmits the frame numbers to the coding side. The coder on the coding side carries out coding processing based on these frame numbers, adjusting the phase of coded blocks of the coded edited data to undergo the insert-recording process to the phase of coded blocks of the reproduced coded data.

In addition, the audio-data recording/playback apparatus 30 does not start the insert-recording process immediately from a boundary position between two consecutive frames in accordance with the insert command signal which is synchronized with frames. Instead, the reproduced coded data D26 up to the boundary position between two consecutive coded blocks is re-recorded through the delay circuit 39, the switcher 36 and the error-code adding circuit 37. It is not till the boundary position between two consecutive coded blocks is reached that the coded edited data D23 (that is, the insert data) output by the coding circuit 31 is supplied to the recording head through the switcher 36 and the error-code adding circuit 37 to be recorded into the magnetic tape.

The operations described above also hold true of the end of the insert-recording process. That is to say, the audio-data recording/playback apparatus 30 does not end the insert-recording process of the coded edited data D23 at a boundary position between two consecutive frames in accordance with the insert command signal which is synchronized with frames. Instead, the insert-recording process of the coded edited data D23 is continued till the boundary position between two consecutive coded blocks. It is not till the boundary position between two consecutive coded blocks is reached that the switcher 36 is switched over to re-record the reproduced coded data D26.

As has been described earlier, in the case of the conventional audio-data recording/playback apparatus wherein data can be edited, discontinuity may result in a coded block crossing the boundary between two consecutive frames, giving rise to unreproducible coded data. This is because insert data is concatenated to recorded data on the boundary between two consecutive frames. In the case of the audio-data recording/playback apparatus 30 implemented by the embodiment, on the other hand, the phase of coded blocks of reproduced coded data is adjusted to the phase of coded blocks of coded edited data. On the top of that, an insert-recording process is started or ended on a boundary between two consecutive coded blocks. As a result, all coded data can be played back.

In this way, a coded block with discontinuity can be prevented from being produced at positions before and after an edit point. On the top of that, pieces of coded data of different generations can be prevented from being mixed with each other in a coded block. As a result, all coded data can be decoded even if the edit processing is not carried out in synchronization with coded blocks.

According to the configuration described above, the process to record insert data (that is, the coded edited data D23) is neither started nor ended on a boundary between two consecutive frames. Instead, it is not till a location matching a boundary between two consecutive coded blocks is reached, which location is selected among a position specified by the insert command signal S10 and positions before or after the specified position, that the insert-recording process is started or ended. As a result, discontinuity of a coded block can be avoided even if the edit processing is initiated by an insert command signal S10 which is not synchronized with a coded block.

In addition, coded data with frame numbers added thereto in advance is recorded and, in an insert-recording process, the frame numbers are extracted from reproduced coded data and used for determining the phase of coded blocks of coded edited data, allowing the phase of coded blocks of the reproduced coded data to be adjusted to the phase of coded blocks of coded edited data. As a result, the insert operation on a boundary between two consecutive coded blocks can be simplified.

It should be noted that, in the embodiment described above, the first coded audio data is the reproduced coded data D26 recorded in the magnetic tape 25 and the second coded data is the edited coded data D23 coded by the coding circuit 31. The second coded audio data D23 is inserted into the first coded audio data D26 when the boundary between two consecutive coded blocks of the former coincides with that of the latter. It should be noted, however, that the scope of the present invention is not limited to this aspect of the embodiment. In other words, the present invention can also be applied to wide range of audio-data recording/playback apparatuses wherein the second coded audio data coded in block units not synchronized with frames and fields is inserted into the first coded audio data coded in block units also not synchronized with the frames and fields at a request made by a command signal synchronized with the frames or fields to create coded edited data.

That is to say, even though, in the embodiment described above, the present invention is applied to the audio-data recording/playback apparatus 30 employed in a digital VTR capable of editing data, it should be noted that the scope of the present invention is not limited to this aspect of the embodiment. For example, the effects described above can also be obtained as well even if the present invention is applied to an audio-data recording/playback unit employed in a hard-disk recording/playback apparatus, a magnetic-disk recording/playback apparatus, an optomagnetic recording/playback apparatus and the like or further applied to an audio-data transmitting apparatus.

In addition, in the embodiment described above, frame numbers are added to provide information on offsets from boundaries between any two consecutive frames to boundaries between two consecutive coded blocks and offset conversion tables are provided for finding an offset from a frame number. It should be noted, however, that the scope of the present invention is not limited to this aspect of the embodiment. That is to say, recording process can also be carried out by directly adding information on offsets to coded data.

In addition, in the embodiment described above, information on an offset from a boundary between two consecutive frames to a boundary between two consecutive coded blocks is added to the coded block. It should be noted, however, that the scope of the present invention is not limited to this aspect of the embodiment. For example, the boundary between two consecutive coded blocks can be detected by detecting the header provided at the beginning of the later coded block.

In addition, in the embodiment described above, the phase of coded blocks of the first coded audio data (the reproduced coded data D26) is adjusted in advance to the phase of coded blocks of the second coded audio data (the coded edited data D23) to simplify the insert processing on a boundary between two consecutive coded blocks so as to give a better process. Instead of adjusting the phase of coded blocks of the first coded audio data to the phase of coded blocks of the second coded audio data, the second coded audio data can merely be inserted into the first coded audio data at a point of time when the boundary between two consecutive coded blocks of the former coincides with that of the latter.

Furthermore, in the embodiment described above, audio data undergoes a sub-band coding process. It should be noted, however, that the scope of the present invention is not limited to this aspect of the embodiment. That is to say, the present invention can also be applied to a wide range of coding processes for converting data into block units not synchronized with frames and fields.

What is claimed is:

1. A digital audio signal processing apparatus for creating coded edited data by inserting second coded audio data coded in block units not synchronized with video frames and fields into first coded audio data coded in block units also not synchronized with said frames and said fields, which said first coded audio data has been recorded in a recording medium in advance, in response to a command signal synchronized with said frames or said fields, said apparatus comprising:

offset adding means for adding said first coded audio data with offsets from boundaries between any two consecutive of coded blocks thereof to boundaries between any two consecutive of said frames or fields at recording of said first coded data into said recording medium;

playback means for reproducing coded data recorded in said recording medium;

offset extracting means for extracting said offsets from said first coded audio data;

coding means for using said offsets received from said offset extracting means to make the phase of said coded blocks of said first coded audio data coincide with the phase of said coded blocks of said second coded audio data in a coding process;

recording means for recording said second coded audio data resulting from said coding process carried out by said coding means into a recording medium; and switching means, wherein said first coded audio data reproduced by said playback means and said second coded audio output by said coding means are received by said switching means;

after said command signal is received by said switching means, said first coded audio data is supplied to said recording means until a boundary between two consecutive coded blocks of said first coded audio data reproduced by said playback means coincides with a boundary between two consecutive coded blocks of said second coded audio data output by said coding means, but which is positioned apart from a boundary between two consecutive video frames or fields; and said second coded audio data is supplied to said recording means at a point of time said boundary between said two consecutive coded blocks of said first coded audio data coincides with said boundary between said two consecutive coded blocks of said second coded audio data, but which is positioned apart from a boundary between two consecutive video frames or fields.

2. A digital audio signal processing apparatus according to claim 1, wherein said second coded audio data to be recorded by said recording means into said recording medium is inserted to said first coded audio data before being recorded into said recording medium.

3. The digital audio signal processing apparatus according to claim 1, further comprising:

delay means for delaying said second coded audio data by a time required for delaying said recording means to record said first coded audio data, which has been reproduced by said playback means, into an original playback location.

* * * * *